United States Patent [19]

Sasaki et al.

[11] Patent Number: 4,650,215
[45] Date of Patent: Mar. 17, 1987

[54] SEAT BELT FORWARDING DEVICE

[75] Inventors: Kiichi Sasaki, Wako; Hidetoshi Saruwatari, Shioya; Kazuo Higuchi, Utsunomiya; Hisakazu Okuhara, Utsunomiya; Hiroshi Tabata, Utsunomiya, all of Japan

[73] Assignee: Honda Giken Kogyo Kabushiki Kaisha, Tokyo, Japan

[21] Appl. No.: 794,570

[22] Filed: Nov. 4, 1985

[30] Foreign Application Priority Data

Nov. 2, 1984 [JP] Japan .................................. 59-231761
Nov. 2, 1984 [JP] Japan ........................... 59-166601[U]
Nov. 2, 1984 [JP] Japan ........................... 59-166602[U]

[51] Int. Cl.⁴ .............................................. B60R 22/00
[52] U.S. Cl. ........................................ 280/808; 74/470
[58] Field of Search ....................... 280/801, 802, 808; 297/481, 468, 483; 74/470

[56] References Cited

U.S. PATENT DOCUMENTS 1,891,101 12/1932 Le Count .............................. 74/470
2,656,178 10/1953 Hughes .................................. 74/470
4,496,170 1/1985 Sasaki et al. .......................... 280/801

Primary Examiner—John J. Love
Assistant Examiner—Karin L. Ferriter
Attorney, Agent, or Firm—Lyon & Lyon

[57] ABSTRACT

Disclosed is a seat belt forwarding system having a rotary arm carrying an end of a seat belt at its free end. The rotary arm is driven by a tension cable by way of a rotary unit having three transmitting members which are coaxially arranged and supported in a freely rotatable manner. By advantageous arrangement of the transmitting members, even when motion of the rotary arm is obstructed, spring means advantageously absorb the resultant force and no excessive force will be produced in the rotary unit. The first spring means biases the second transmitting member in a rearward direction while the second spring means is engaged between the second and the third transmitting members. The transmitting of force between the transmitting members is achieved by projections provided in the opposing surfaces of the transmitting members, in addition to the transmission of force between the second and the third transmitting members by the second spring means.

10 Claims, 13 Drawing Figures

SEAT BELT FORWARDING DEVICE

This invention relates to a seat belt forwarding device (seat belt reacher device) for facilitating the fastening of a seat belt by rotating a rotary arm carrying an end of the seat belt in a forward direction, and in particular to such a belt forwarding device which is simple and reliable.

Although the necessity of wearing a seat belt while driving is widely recognized, it has not been entirely successful to encourage drivers and passengers to wear seat belts. Therefore, there have been various efforts to facilitate the use of a seat belt. For instance, the Inventors are aware of a known device according to which an end of a seat belt is carried by a carriage which may travel above the car door in the longitudinal direction and, by closing of the door, the seat belt is passed over the driver or the passenger. However, it has the disadvantage that there has to be a lock mechanism which can securely hold the seat belt against the greatest possible tension of the seat belt and, therefore, it is extremely difficult to obtain the required reliability.

It is possible to use a belt forwarding device according to which an end of a seat belt is attached to the free end of a rotary arm and the rotary arm is rotated in a forward direction in response to a closing action of a door for the purpose of facilitating the fastening of the seat belt but, presumably because of various technical difficulties in assuring a sufficient reliability of the action, such a belt forwarding device has not been proposed for a practical application. It may be possible to use a pneumatic cylinder or an electric motor to activate such a belt forwarding device, but the structure will be too complex for commercial production and sufficient reliability will not be achieved.

In view of such shortcomings of the prior art, a primary object of this invention is to provide a seat belt forwarding device of a type which may be driven by a cable pulled in synchronization with the closing action of the door and is highly simple and reliable.

Another object of this invention is to provide a seat belt forwarding device which will cause substantially no discomfort to the driver or the passenger.

Yet another object of this invention is to provide a seat belt forwarding device which has a rotary arm carrying an end of a seat belt at its free end.

Yet another object of this invention is to provide a seat belt forwarding device using a rotary arm which is free from problems that might otherwise occur when the motion of the rotary arm is obstructed by a person or an object.

Yet another object of this invention is to provide a seat belt forwarding device which is relatively free from wear and highly durable.

According to this invention, such an object is achieved by providing a seat belt forwarding device for facilitating the fastening of a seat belt by rotating a rotary arm, carrying an end of a seat belt, in a forward direction, comprising: a control cable which is adapted to be pulled according to a closing action of a door; a first transmitting member rotatably supported and having a pulley which may be rotatively driven by the control cable; a second transmitting member arranged coaxially with the first transmitting member in a freely rotatable manner; a third transmitting member coaxially arranged with the first and the second transmitting members and carrying the rotary arm integrally therewith; a first engagement portion provided in a side surface of the first transmitting member opposite to a first side surface of the second transmitting member; a second engagement portion provided in the first side surface of the second transmitting member opposite to the side surface of the first transmitting member; a third engagement portion provided in the second side surface of the second transmitting member; a fourth engagement portion provided in a side surface of the third engagement member opposite to the second side surface of the second transmitting member; a first spring means which biases the second transmitting member in a rearward direction; a second spring means which is engaged to the second transmitting member at its one end and to the third transmitting member at its other end; the angular relationship between the first engagement portion and the second engagement portion being such that, under normal condition, the forward rotation of the first transmitting member is directly transmitted to the second transmitting member but the rearward rotation of the first transmitting member does not force the rearward rotation of the second member; the angular relationship between the third engagement portion and the fourth engagement portion being such that, under normal condition, the forward rotation of the second transmitting member does not directly force the forward rotation of the third transmitting member but the rearward rotation of the second transmitting member is directly transmitted to the rearward rotation of the third transmitting member.

By thus advantageously arranging the three transmitting members, the action of the seat belt forwarding device will not be hampered and excessive force will not be applied to the seat belt forwarding device even when the motion of the rotary arm is obstructed by a person or an object.

According to a certain aspect of the present invention, the direction of the pulling action of the control cable and the direction of the rotative drive of the first transmitting member on the second transmitting member are substantially identical particularly when the rotary arm is near its forwardly inclined position.

Since the pulley to be driven by the cable, which is adapted to be pulled by the closing action of the door, is not subjected to an excessive moment which tends to rotate the pulley relative to its rotational shaft, no excessive force will act upon the bearing of the pulley and the reliability of the belt forwarding device will be improved.

According to yet another aspect of the present invention, a torsion coil spring is interposed between the two adjacent transmitting members for avoiding any excessive force acting on the rotary unit when the motion of the rotary arm is obstructed by a person or an object interfering therewith. In particular, if the a torsion coil spring is accommodated in a depression formed at least in one of the transmitting members, a very compact design will be achieved.

According to yet another aspect of the present invention, the transmitting member opposing the depression which receives the torsion coil spring is provided with a tubular collar which loosely fits into the torsion coil spring and, optionally, at least one projection protruding radially on its outer circumferential surface.

Since the torsion coil spring tends to deform into an oblique position relative to its central axial line as it undergoes a torsional displacement, the friction between the torsion coil spring and the member surrounding it may impair the smoothness of the action and the durability of the transmitting member. However, the tubular collar prevents the oblique deformation of the torsion coil spring. Furthermore, since the relative displacement between the tubular collar and the torsion coil spring is substantially smaller than the relative displacement between the torsion coil spring and the transmitting member surrounding it, the friction between the tubular collar and the torsion coil spring will be small. And, the projection on the outer circumferential surface of the tubular collar further reduces the friction between the torsion coil spring and the tubular collar.

The present invention will now be shown and described in the following in terms of concrete embodiments thereof with reference to the appended drawings, in which.

Figure 1:
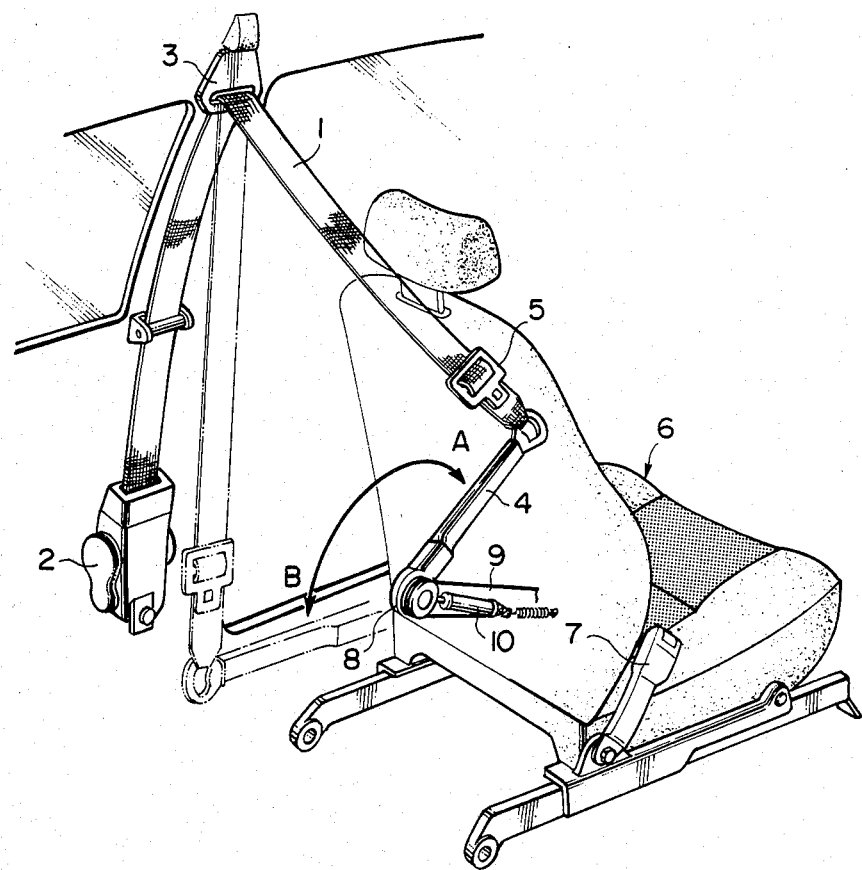
FIG. 1 is a perspective view showing an overall structure of a seat belt forwarding device of this invention.

FIG. 1 is a general perspective view of a seat belt forwarding device according to this invention. A seat belt 1 is attached to the free end of a rotary arm 4 which seat belt extends from a belt retractor 2 and through a through ring 3 to rotary arm 4. When the door is open, the rotary arm 4 is in a rearwardly inclined position as indicated by an arrow B and imaginary lines, and, as the door is closed, the rotary arm 4 rotates in a forward direction as indicated by an arrow A. A tongue plate 5 is attached to the seat belt 1 near its free end and, once the rotary arm 4 has rotated forwardly, a passenger seated in a seat 6 can readily engage the tongue plate 5 with a buckle 7 which is attached to the other side of the seat 6. Since the seat belt 1 will be located in a position which is suitable for the passenger to fasten the seat belt, the use of the seat belt is effectively encouraged without giving him any constraining impression.

It is possible to utilize drive sources of various types for driving the seat belt forwarding device and in particular its rotary arm but, according to this embodiment, the force applied to the door to close it is transmitted to a rotary unit 8 which is connected to the rotary arm 4, by way of a control cable 9 whose one end is connected to a door checker provided in a door panel, as a pulling force of the control cable, and the rotary arm 4 is thus driven with the closing force applied to the door used as a drive source. A door checker which may be advantageously used for driving the rotary unit 8 is disclosed in the copending U.S. patent application No. 766,092 which has been assigned to the same Assignee.

Figure 2:
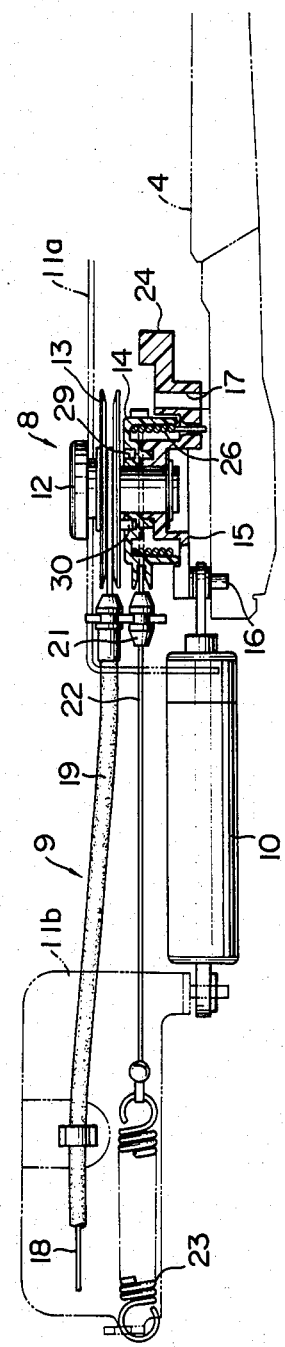
FIG. 2 is a partly broken-away plan view showing an essential portion of the seat belt forwarding device of FIG. 1.
Figure 3:
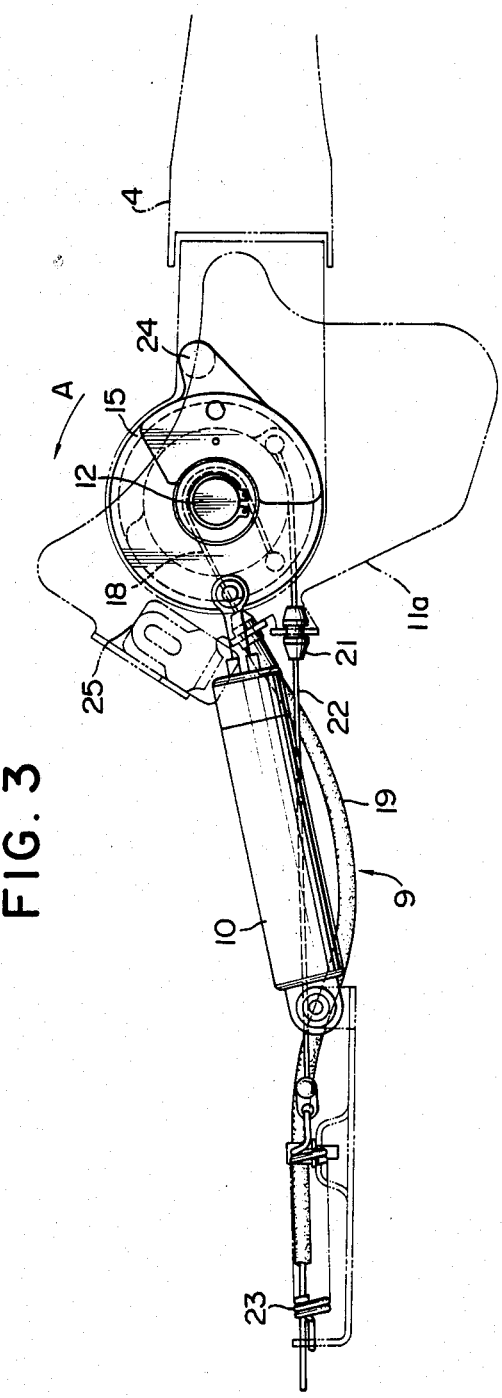
FIG. 3 is a side view of an essential portion of the same embodiment.

FIGS. 2 and 3 show the rotary unit 8 of FIG. 1 in greater detail. One end of an outer cable 19 of the control cable 9 is engaged to a fixed bracket 11a of a seat assembly and one end of an inner cable 18 passed through the outer cable 19 is wound around a first pulley 13 serving as a first transmitting member. The first pulley 13 is rotatably supported by a pivot shaft 12 which is fixedly secured to the fixed bracket 11a of the seat assembly. The pivot shaft 12 further supports a second pulley 14 serving as a second transmitting member adjacent to the first pulley 13, and a cable 22 wound around the second pulley 14 is connected to an end of a tension coil spring 23 at its free end by way of a cable guide 21 fixedly secured to the fixed bracket 11a. The other end of the tension coil spring 23 is engaged to a fixed bracket 11b and the tension coil spring 23 rotatively biases the second pulley 14 in one direction or in the direction corresponding to the rearward rotation of the rotary arm 4 by way of the cable 22.

The pivot shaft 12 further supports a disc member 15 serving as a third transmitting member, in a freely rotatable manner, adjacent to the second pulley 14. A base end of the rotary arm 4 is fixedly secured to the disc member 15 by way of a mounting hole 17 and a pin 16 which is engaged with a pin (unnumbered) and a hole (unnumbered), respectively, provided in the base of the rotary arm 4. An end of a damper 10 for controlling the motion of the rotary arm 4 is connected to the pin 16. A stopper projection 24 is integrally formed in a part of the disc member 15 and determines the maximum extent of the forward rotation of the rotary arm 4 by cooperating with a stopper member 25 made of rubber and integrally attached to the fixed bracket 11a.

Figure 4:
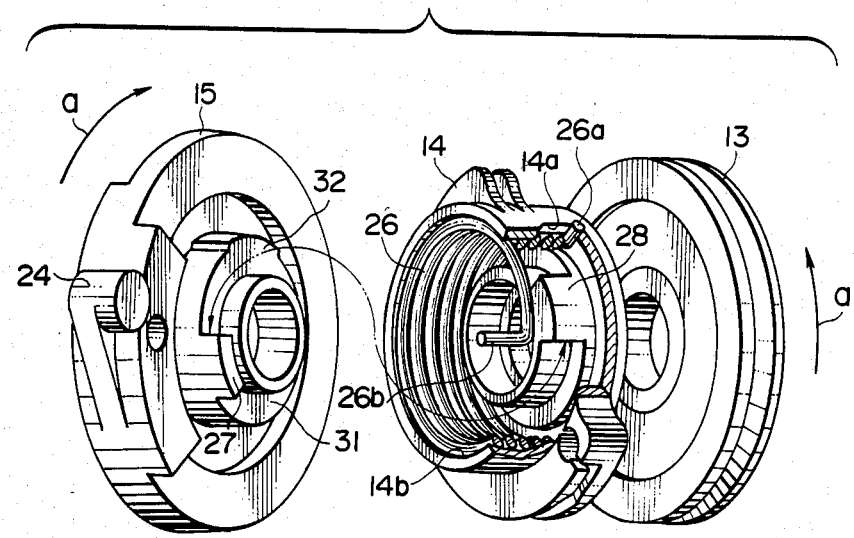
FIGS. 4 and 5 are exploded perspective views illustrating the relationships between the three transmitting member used in the above embodiment.
Figure 5:
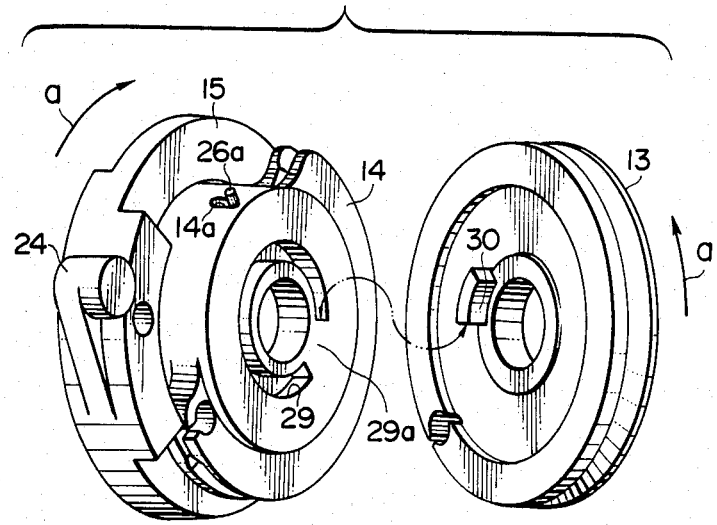

FIGS. 4 and 5 are exploded perspective views showing the relationships between the pulleys 13 and 14 and the disc member 15 in greater detail. As best shown in FIG. 4, the face of the second pulley 14 opposing the disc member 15 is provided with an annular depression 14b accommodating a torsion coil spring 26. An end 26a of the torsion coil spring 26 is engaged to a hole 14a provided in the second pulley 14 while the other end 26b of the torsion coil spring 26 is likewise engaged to a hole (not shown in the drawings) provided in the disc member 15. The mutually opposing surfaces of the disc member 15 and the second pulley 14 are provided with arcuate projections 27 and 28 which are concentrically disposed and extend over an angle of about 45 degrees, and by mutual engagement of the ends of these arcuate projections 27 and 28 the range of the relative rotation of the disc member 15 and the second pulley 14 is determined.

When a driving force is to be transmitted from the pulley 14 to the disc member 15 for forward rotation of the rotary arm 4, as indicated by an arrow a in FIG. 4, the force is transmitted between the disc member 15 and the pulley 14 by way of the torsion coil spring 26. When a driving force is to be transmitted between the pulley 14 and the disc member 15 for rearward rotation of the rotary arm 4, the driving force is directly transmitted by direct engagement of the two arcuate projections 27 and 28.

As clearly shown in FIG. 5, the second pulley 14 and the first pulley 13 are provided with an annular groove 29 and an arcuate projection 30, respectively, in their mutually opposing surfaces, in a concentric manner relative to the central axial line along a same circumferential line. The annular groove 29 is provided over a range of about 315 degrees, thus defining an arcuate projection 29a extending over an angle of about 45 degrees, while the arcuate projection 30 is provided over a range of about 45 degrees. The two pulleys 13 and 14 are assembled in such a manner that the arcuate projection 30 is received by the annular groove 29.

As mentioned previously, the second pulley 14 is always biased by the tension coil spring 23 so as to tend to cause the rotary arm 4 to rotate rearwardly and, when the first pulley 13 is rotated by the inner cable 18 which is pulled by the closing action of the door, the arcuate projection 30 engages an end of the annular groove 29 or the projection 29a and rotative driving force is directly transmitted from the first pulley 13 to the second pulley 14. However, if the door is opened with the rotary arm 4 held in its forwardly rotated state for any reason, the first pulley 13 can restore to a position corresponding to the open state of the door with the arcuate projection 30 traveling in the groove 29.

Figure 8:
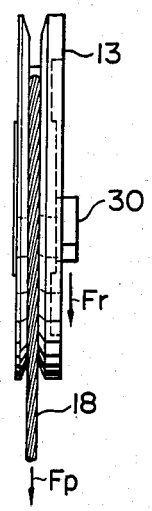
FIGS. 8 and 9 are a front view and a side view of a first pulley serving as the first transmitting member which is based upon the present invention.
Figure 9:
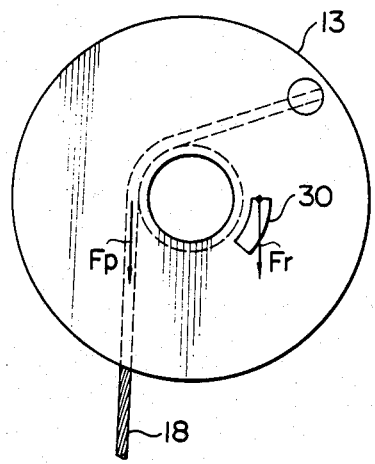

FIGS. 8 and 9 show the structure of the first pulley in greater detail. The first pulley 13 is subjected to the pulling force Fp of the cable 18 and the reaction force Fr acting upon the arcuate projection 30 when the arcuate projection 30 engages with an end of the annular groove 29 of the second pulley 14 to drive the second pulley 14, and, in particular, when the rotary arm 4 is in its forwardly rotated position or when the tension coil spring 23 applies the maximum biasing force to the first pulley 13 by way of the second pulley 14, the pulling force Fp and the reaction force Fr do not act along a same line but are directed in a same direction, whereby there will be substantially no moment which tends to rotate the first pulley with respect to its rotative shaft.

Figure 6:
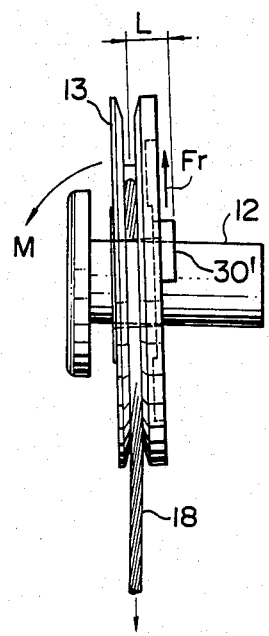
FIGS. 6 and 7 are a front view and a side view of a first pulley serving as the first transmitting member which is not based upon the present invention.
Figure 7:
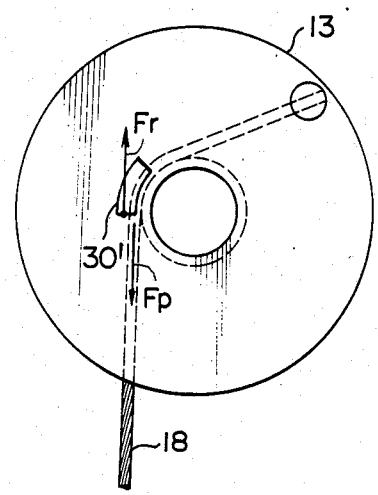

If the pulling force Fp and the reaction force Fr do not act along a same line (acting along two parallel lines which are mutually displaced by a distance L) and are directed in different directions as shown in FIGS. 6 and 7 because of a different arrangement of an arcuate projection 30', there will be a moment M which tends to rotate the first pulley 13 relative to the central axial line thereof and the durability of the first pulley 13 will be severely impaired. Therefore, according to this invention, the circumferential position of the arcuate projection 30 is determined as shown in FIGS. 8 and 9 so that the reaction force Fr acting upon the arcuate projection 30 and the pulling force Fp of the cable may be directed in substantially the same direction particularly when the rotary arm 4 is in its forwardly rotated position or when the pulling force of the cable 18 is at its maximum or when the biasing force of the tension coil spring 23 is at its maximum.

Although, in the above described embodiment, an action of a one-way clutch was obtained by the interaction between the arcuate projection 30 and the annular groove 29 of the first and the second pulleys 13 and 14, respectively, it is possible to use other known mechanisms. Further, although cable 22 and the tension coil spring 23 were used as a means for applying a restoring force to the second pulley 14, it is also possible to use other means.

Figure 10:
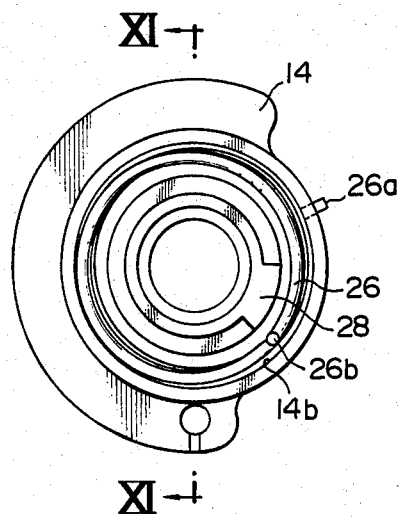
FIG. 10 is a front view showing the torsion coil spring received in a depression of a second pulley serving as the second transmitting member.
Figure 11:
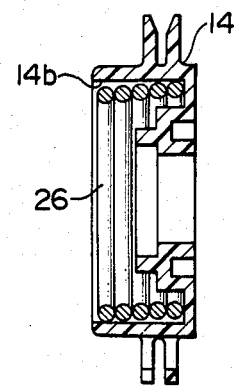
FIG. 11 is sectional view taken along line XI—XI of FIG. 10.

FIGS. 10 and 11 show a state in which the torsion coil spring 26 is fitted into the annular dpression 14b of the second pulley 14, and when a torsional displacement is given to the torsion coil spring 26 the coil wire of the torsion coil spring 26 will incline relative to the rotational axial line as shown in FIG. 11 and some friction will be produced between the torsion coil spring 26 and the inner circumferential wall surface of the depression 14b of the second pulley 14 as the torsion coil spring 26 is twisted relative to the second pulley 14. In particular, since the relative displacement between the part of the torsion coil spring 26 on the side of the disc member 15 and the second pulley 14 is relatively great, the friction therebetween may become a problem.

Figure 12:
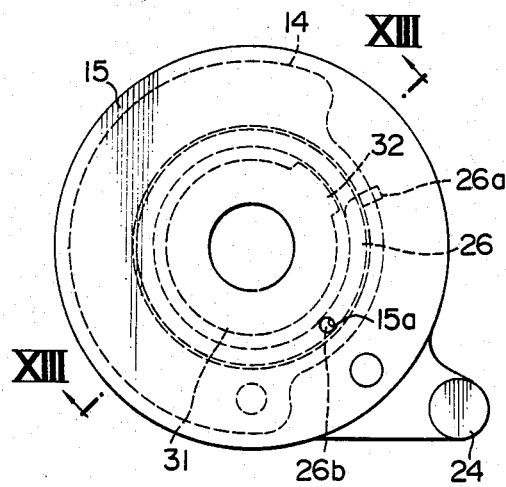
FIG. 12 shows the state in which the pulley serving as the second transmitting member is combined with a disc member serving as the third transmitting member.
Figure 13:
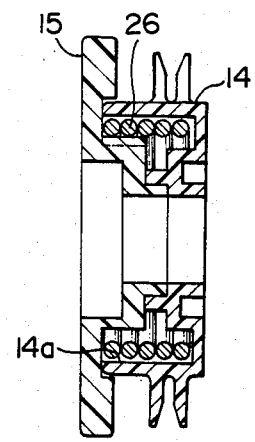
FIG. 13 is a sectional view taken along line XIII—XIII of FIG. 12.

Therefore, according to this invention, as shown in FIGS. 12 and 13, the surface of the disc member 15 opposing the second pulley 14 is integrally provided with an annular collar 31 which fits into the interior of the torsion coil spring 26 and the outer circumferential surface thereof is provided with a projection 32 which projects radially outwardly. Therefore, even when some torsional displacement is given to the torsional coil spring 26, the lateral inclination of the torsional coil spring 26 is restrained by the interaction between the annular collar 31 and the torsion coil spring 26. In this connection, since the contact area of the projection 32 is small and the relative displacement between the disc member 15 and the torsion coil spring 26 on the side of the disc member 15 is extremely small, the friction between the torsional coil spring 26 and the projection 32 or the annular collar 31 will not be a problem.

Now the action of this embodiment is described in the following with reference mainly to FIGS. 3 and 4.

When the door is open, substantially no tension is acting upon the inner cable 18 and the rotary arm 4 assumes a rearwardly inclined position as indicated by imaginary lines in FIGS. 1 through 3. When a passenger is seated and the door is closed, the inner cable 18 is pulled and the first pulley 13 is rotatively driven in a direction indicated by an arrow a in FIGS. 4 and 5 to rotate the rotary arm 4 in a forward direction. Then, the arcuate projection 30 of the first pulley 13 engages with an end of the annular groove 29 of the second pulley 14 and drives the second pulley 14 in the direction indicated by arrow a against the spring force of the tension coil spring 23. At the same time, the second pulley 14 drives the disc member 15 in the direction a by way of the torsion coil spring 26 to rotate the rotary arm 4 in a forward direction. Thus, the passenger can reach for the tongue plate 5 located near the free end of the seat belt 1 with a natural posture and can readily engaged the tongue plate 5 with the buckle 7 for fastening the seat belt 1.

Since the driving force is transmitted between the second pulley 14 and the disc member 15 by way of the torsion coil spring 26, the speed of the forward rotation of the rotary arm 4 can be appropriately controlled by the damper 10 connected to the pin 16 of the disc member 15. When the rotary arm 4 is interfered with in its motion by some object, the driving force tending to forwardly rotate the rotary arm 4 is absorbed by the torsion coil spring 26 and no excessive force will act upon the rotary unit 8.

When the tongue plate 5 is released from the buckle 7 with the door kept closed, the rotary arm 4 remains in its forwardly inclined position. When the door is opened in this state, the tension of the inner cable 18 is lost and the second pulley 14 rotates in the direction to rearwardly rotate both the first pulley 13 and the rotary arm 4 by the spring force of the tension coil spring 23 by engagement of the projection 29a and the arcuate projection 30, and the engagement of the arcuate projections 27 and 28. Thereby, the rotary arm 4 is directly driven into its rearwardly inclined position. If the rotary, arm 4 can not rotate rearwardly by being interfered with by some object even though the door is opened, the arcuate projection 30 of the first pulley 13 travels rearwardly in the groove 29 so that the first pulley 13 can rotate freely relative to the second pulley 14 and no excessive force will act upon the inner cable 18 while the rotary arm 4, the disc member 15 and the second pulley 14 are biased rotatively in rearward direction by the tension coil spring 23. Once the object interfering with the rotary arm 4 is removed, the rotary arm 4 restores to the a rearward inclined position by the restoring force of the tension coil spring 23.

Although, in the above described embodiment, an action of a one-way clutch was obtained by the interaction between the arcuate projection 30 and the annular groove 29 of the first and the second pulleys 13 and 14, respectively, it is possible to use other known mechanisms. Further, although the cable 22 and the tension coil spring 23 were used as a means for restoring the second pulley 14, it is also possible to use other means.

Thus, according to this embodiment, because the structure is simple, its manufacturing cost is low and its reliability is high. Since the spring means can absorb driving force even when the door is opened and closed while the rotary arm is constrained, excessive force will not act upon any part of the system and its durability is assured.

In particular, because there is substantially no moment which tends to rotate the first pulley 13 with respect to its rotative shaft, the durability of the bearing for the first pulley is assured.

Furthermore, by accommodating the torsion coil spring for transmitting the driving force in the depression provided, for instance, in the second pulley, the rotary unit may be designed in a compact manner. Further by providing a collar optionally having a projection protruding in a radial and outward direction at least in one of the transmitting members, the deformation of the torsion coil spring resulting from the displacement thereof can be restrained whereby the smoothness of the action of the rotary unit is assured and its reliability is improved.

Therefore, the seat belt forwarding device of this invention is highly durable and compact and can effectively encourage the use of a seat belt.

Although the present invention has been shown and described with reference to the preferred embodiment thereof, it should not be considered as limited thereby. Various possible modifications and alterations to any particular embodiment could be conceived of by one skilled in the art without departing from the scope of the invention.

What we claim is:

1. A seat belt forwarding device for facilitating the fastening of a seat belt by rotating a rotary arm, carrying an end of a seat belt, in a forward direction, comprising:

a control cable which is adapted to be pulled according to a closing action of a door;
    a first transmitting member rotatably supported and having a pulley which may be rotatively driven by the control cable;
    a second transmitting member arranged coaxially with the first transmitting member in a freely rotatable manner;
    a third transmitting member coaxially arranged with the first and the second transmitting members and carrying the rotary arm integrally therewith;
    a first engagement portion provided in side surface of the first transmitting member opposite to a first side surface of the second transmitting member;
    a second engagement portion provided in the first side surface of the second transmitting member opposite to the side surface of the first transmitting member;
    a third engagement portion provided in a second side surface of the second transmitting member;
    a fourth engagement portion provided in a side surface of the third transmitting member opposite to the second side surface of the second transmitting member;
    a first spring means which biases the second transmitting member in a rearward direction;
    a second spring means which is engaged to the second transmitting member at its one end and to the third transmitting member at its other end;
    the angular relationship between the first engagement portion and the second engagement portion being such that, under normal condition, the forward rotation of the first transmitting member is directly transmitted to the second transmitting member but the rearward rotation of the first transmitting member does not force the rearward rotation of the second member; and
    the angular relationship between the third engagement portion and the fourth engagement portion being such that, under normal condition, the forward rotation of the second transmitting member does not directly force the forward rotation of the third transmitting member but the rearward rotation of the second transmitting member is directly transmitted to the rearward rotation of the third transmitting member.

2. A seat belt forwarding device as defined in claim 1, wherein the second transmitting member is provided with a pulley groove in its outer circumferential surface, and the first spring means comprises a wire wound around the second transmitting member and a spring member applying tension to the wire.

3. A seat belt forwarding device as defined in claim 1, wherein the second spring means comprises a torsion coil spring arranged coaxially with the transmitting members.

4. A seat belt forwarding device as defined in claim 3, wherein a damper controls the motion of the rotary arm.

5. A seat belt forwarding device as defined in claim 4, wherein the torsion coil spring is received in a depression formed at least in the second transmitting member and or the third transmitting member in its a side surface opposing the other transmitting member.

6. A seat belt forwarding device as defined in claim 5, wherein at least one of the second or the third transmitting members is provided with a tubular collar which loosely fits into the torsion coil spring in a substantially coaxial manner.

7. A seat belt forwarding device as defined in claim 6, wherein a radial projection is provided in the outer circumferential surface of the tubular collar.

8. A seat belt forwarding device as defined in claim 1, wherein the third transmitting member is provided with a stopper projection which cooperates with a fixed stopper member to define a maximum extent of the forward rotation of the rotary arm.

9. A seat belt forwarding device as defined in claim 1, wherein the direction of the pulling action of the control cable and the direction of the rotative drive of the first transmitting member on the second transmitting member are substantially identical when the rotary arm is near its forwardly inclined position.

10. A seat belt forwarding device as defined in claim 1, wherein the engagement portions are comprised of arcuate projections which extend over an angle of about 45 degrees about the center of rotation of the transmission members.

* * * * *